Dec. 30, 1952  R. B. FOSTER  2,623,713
AIRCRAFT FOLDING WING AND POWER PLANT ARRANGEMENT
Filed March 19, 1949  2 SHEETS—SHEET 2
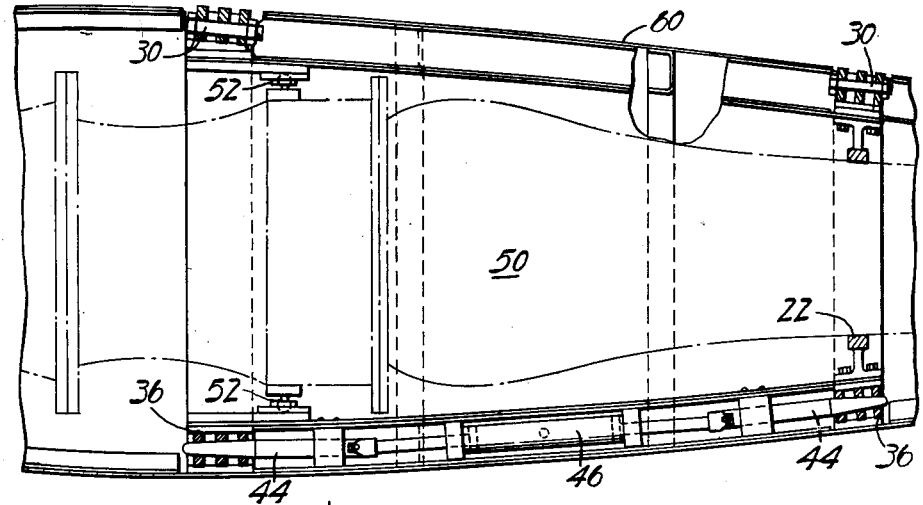
Fig. 3.
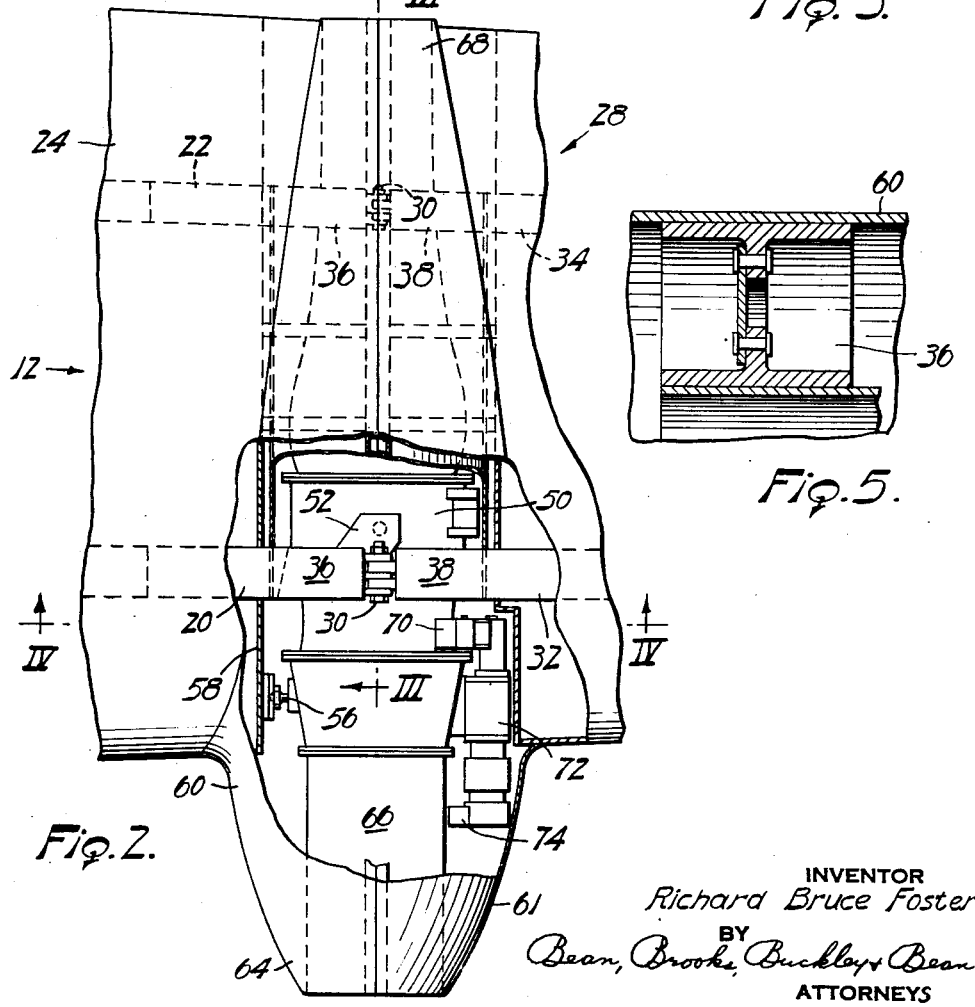
Fig. 5.
Fig. 2.
INVENTOR
*Richard Bruce Foster*
BY
*Bean, Brooks, Buckley & Bean*
ATTORNEYS Patented Dec. 30, 1952

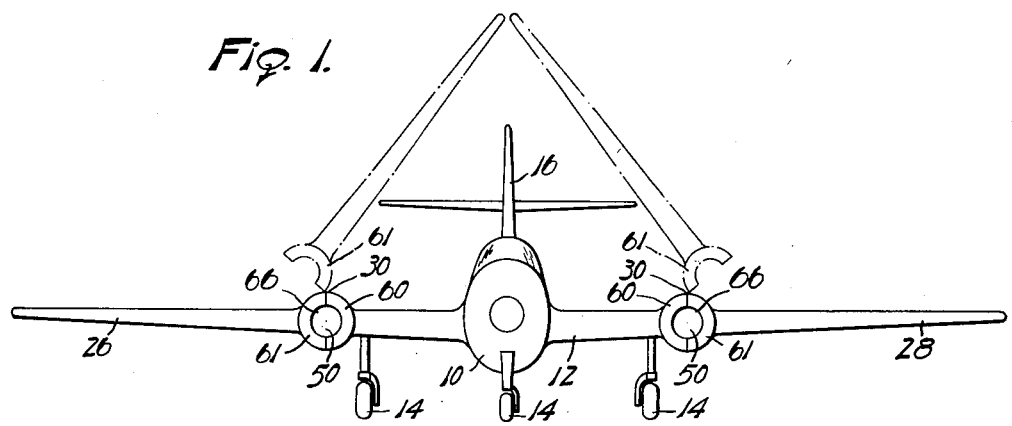
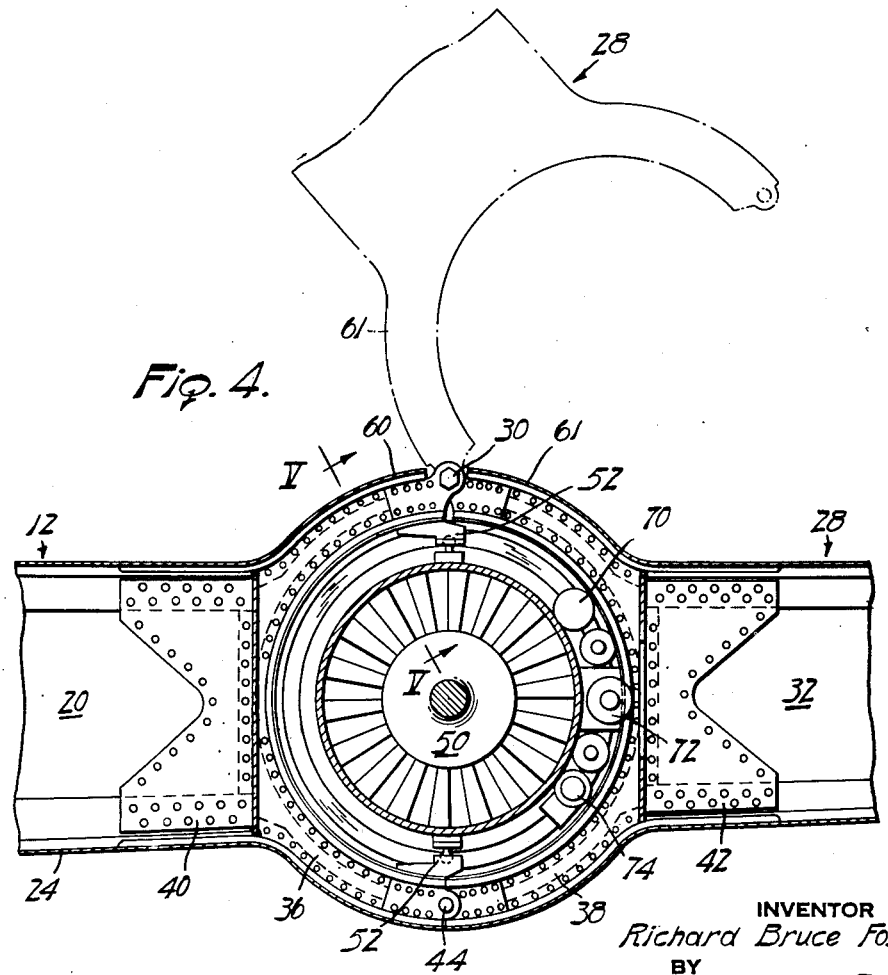

2,623,713

UNITED STATES PATENT OFFICE 2,623,713

AIRCRAFT FOLDING WING AND POWER PLANT ARRANGEMENT

Richard Bruce Foster, Grand Island, N. Y., assignor to Bell Aircraft Corporation, Wheatfield, N. Y.

Application March 19, 1949, Serial No. 82,358

7 Claims. (Cl. 244—49)

This invention relates to aircraft, and more particularly to improvements in aircraft of the folding wing type.

The present invention has particular application to aircraft requiring to be stored in cramped quarters, such as aircraft carrying naval vessels. Such aircraft require to be rapidly compacted as by folding the main wing panels so that the craft may immediately upon landing on the carrier deck be conducted to a servicing station out of the way of other landing and take-off operations. A folding wing aircraft design for such purposes is disclosed for example in U. S. Patents Nos. 2,289,224 and 2,290,850.

The present invention provides an improvement in folding wing aircraft of the type referred to hereinabove, and relates to an improved disposition of the aircraft engines and engine nacelle structures in relation to the relatively hinged components of such folding wing type aircraft.

One of the objects of the present invention is to provide a folding wing type aircraft embodying an improved engine mounting arrangement.

Another object of the present invention is to provide a folding wing type aircraft embodying an improved engine mounting arrangement whereby the engine components requiring relatively frequent servicing are disposed for improved accessibility thereto, automatically and incidental to the wing folding operations.

Another object of the present invention is to provide a folding wing type aircraft embodying an improved engine mounting arrangement whereby the wing hinge lock and the engine mount arrangements are of improved structural form.

Other objects and advantages of the present invention will appear from the specification hereinafter.

In the drawings:

Fig. 1 is a front end view of an airplane embodying a folding wing and engine mount and nacelle arrangement of the invention; showing the wing panels in extended flight condition by means of solid lines, and the wings in folded condition by means of broken lines;

Fig. 2 is a fragmentary plan view partly in section, on a larger scale, of a wing folding hinge and engine mount and nacelle arrangement thereof;

Fig. 3 is a fragmentary vertical section taken along line III—III of Fig. 2;

Fig. 4 is a fragmentary vertical section, on an enlarged scale, taken along line IV—IV of Fig. 2; and Fig. 5 is a fragmentary section, on an enlarged scale, taken along line V—V of Fig. 4.

As illustrated in the drawing, an airplane embodying the invention is shown to comprise a fuselage 10; a fixed wing section 12 extending rigidly from opposite sides of the fuselage; undercarriage elements 14; and empennage structures 16. As shown in the figures the wing structure 12 includes appropriate structural elements such as a main spar 20 and a rear spar 22, as well as the skin structure 24 and other suitable stiffening and bracing elements (not shown). As shown generally in Fig. 1, folding wing tip panels 26—28 are hingedly connected to the outer ends of the fixed wing section so as to hinge thereon about pivot devices as indicated at 30—30 between the operative and folded positions thereof as shown in Fig. 1. To this end the wing tips 26—28 also include spar members 32—34 in positional alignment with the main wing spars 20—22 to carry the interconnection loads.

However, in accord with the present invention the adjacent end portions of the spar devices of the main wing panel and the corresponding folding wing panel are provided with enlarged yoke brackets such as are illustrated at 36—38 in Fig. 4. These brackets are rigidly mounted upon the corresponding spar members, as indicated at 40—42 respectively (Fig. 4), and the yoke structures each comprise a pair of arms curving away from the corresponding spar member in the plane thereof and outwardly therefrom so as to comprise a semi-circular yoke of a diameter substantially greater than the vertical thickness dimension of the wing structure. Hence, the cooperating yoke elements at each hinged juncture of the wing panels comprise an enlarged circular housing as viewed for example in Figs. 1-4. At their upper end portions the coacting yoke members are pivotally interconnected by means of the hinge pins 39 in order to provide the wing tip panel folding hinge arrangement referred to hereinabove. At their opposite or lower corresponding end portions the yoke members are arranged to accommodate locking pin devices such as are indicated at 44 (Figs. 3-4) whereby the wing tips 26—28 may be locked to the main fixed wing panel in extended flying position. A hydraulic jack device is indicated at 46 (Fig. 3) for control of the locking pins 44—44 in response to pilot control of the associated hydraulic system, as is well known in the folding wing art.

Thus, it will be appreciated that the wing tip panels 26—28 are hinged to the main wing section along the axes of the hinge devices 30—30 which pivotally interconnect the top arm portions of the spar yoke members; while the locking pin devices 44—44 coact with the lower arm portions of the spar yoke members for locking the wing tips against unintended folding under flight operation conditions; and it will be appreciated that by reason of the expansion of the yoke arms compared to the vertical thickness of the spar members the hinging and locking points are thereby relatively spaced at a distance apart substantially greater than is possible in a conventional wing folding arrangement. Thus, when the wing panels are in extended and locked position they are maintained in locked position with improved facility by reason of the increased spread between the hinge and locking pin axes; and therefore a more rugged and safe aircraft is obtained.

The above referred to improvement in wing locking strength is obtained in the case of the present invention without sacrifice of overall aerodynamic characteristics by reason of the fact that the enlarged yoke structure is also employed to accommodate the aircraft engines; the enlarged circular housing configuration of the yoke members being ideally suited to accommodate turbo-jet engines, for example, as are indicated generally at 50. In fact, the engine mounting connections conventionally furnished to extend from such engines at approximately the longitudinal position of the center of gravity thereof are thereby conveniently disposed for direct connection to the inboard main wing spar, as indicated at 52—52, at the top and bottom of the engine casting respectively. An engine stabilizing connection device may be conveniently arranged as indicated at 56 (Fig. 2) to connect to a suitably braced portion of the main wing panel 58. Thus, the enlarged yoke structure as well as the engine may be conveniently enclosed within a cowling or nacelle such as is indicated generally at 60 which includes an outer skin merging into the skin covering of the wing panels and split at the top and bottom thereof closely adjacent the wing hinge and locking pin axes to permit the wing folding action referred to. At its front end, each cowling structure 60 is reduced to conventional jet engine air intake nose form, as shown at 64 (Fig. 2), and is open at its front end to provide an air inlet aperture in line with the air intake duct 66 of the engine. Similarly, at the trailing edge, the nacelle 60 is streamlined and apertured to accommodate the tail pipe 68 of the engine.

Thus, it will be appreciated that the enlarged spar-yoke structure provides a folding wing hinge and lock arrangement of improved strength while at the same time providing an improved engine mounting arrangement because it provides a widely spaced point engine mount type support without increase of overall frontal area of the aircraft structure over the requirements for accommodation of the aircraft engines. Also, the area centrally of the outspread yoke arms is usefully employed for receiving and conducting intake air to the engine.

It is another particular feature and advantage of the present invention that the wing folding and engine mount and nacelle arrangement referred to hereinabove permits an improved arrangement for servicing the engine components which require relatively frequent attention. For example, as shown in Figs. 2 and 4, engine accessories such as the fuel pumps, ignition elements, electrical accessories, and the like may be attached to the engine 50 at the outboard side thereof as indicated at 70—72—74 (Figs. 2 and 4) whereby such instrumentalities are directly exposed in most accessible position to servicing personnel immediately upon folding of the wing tips 26—28 as to the broken line positions thereof shown in Fig. 1. Thus, the engines are immediately "opened up" to inspection and service, upon folding of the wing tips; and it will be appreciated that in connection with carrier based warplane tactics, the aircraft of the invention will provide important advantages over comparative aircraft because immediately upon landing upon the carrier deck the wings may be folded and the servicing crew may go to work at once upon the engines while the aircraft is being conducted to a servicing or storage deck. Hence, the aircraft may be restored to operative condition in less time than heretofore.

It will be appreciated that although the present invention has been illustrated and described herein in connection with only one specific form of application thereof to a known type aircraft, the invention is not so limited but that various changes may be made therein without departing from the spirit of the invention or the scope of the appended claims.

I claim:

1. A folding wing type aircraft comprising a body, a fixed wing panel extending from opposite sides of said body, a folding wing panel hingedly connected to each outer end portion of said fixed wing panel to comprise in combination with said fixed wing panel a foldable wing aircraft, said fixed wing panel and folding wing panels each including vertically disposed directionally aligned spar sections extending spanwise thereof, said spar sections in the regions of hinging connections between said fixed wing panel and said folding wing panels being provided with oppositely directed C-shaped yoke end portions terminating respectively in top and bottom end portions and pivotally interconnected respectively at the adjacent top end portions thereof to provide the hinge connections between said fixed wing panel and said folding wing panels, latch means relatively engaging the lower end portions of adjacent of said yoke members for detachably locking the yoke members together when said wing panels are in extended positions as distinguished from folded positions, and aircraft engine means mounted upon the spar sections of said fixed wing panel so as to be disposed within the configurations of the cooperating yoke portions when said folding wing panels are in extended positions, whereby upon upward pivoting of said folding wing panels said engine means are thereby substantially uncovered and rendered accessible for servicing operations.

2. A folding wing type aircraft comprising a body, and folding wing panels hingedly mounted upon said body, said body and wing panels in the regions of hinging interconnection being provided with vertically disposed paired oppositely facing C-shaped yoke end portions terminating respectively in top and bottom end portions and pivotally interconnected at the adjacent top end portions thereof to provide the hinging connections between said body and said wing panels, latch means for locking said wing panels when in extended positions as distinguished from folded positions, and aircraft engine means mounted upon said body so as to be disposed within the configurations of the cooperating yoke portions when said wing panels are in extended positions, whereby upon upwardly folding of said wing panels said engine means are rendered accessible for servicing operations.

3. A folding wing type aircraft comprising a body, a folding wing panel hingedly connected to said body to comprise in combination therewith a folding wing aircraft, said wing panel including a vertically disposed spar section extending in spanwise direction thereof, said spar section in the region of the hinge connection being provided with a C-shaped yoke end portion terminating in top and bottom end portions and pivotally connected at its top end portion to said body, latch means for locking said wing panel in extended position as distinguished from folded position, and aircraft engine means mounted so as to be disposed within the configuration of said yoke portion when said wing is in extended position, whereby upon upward folding of said wing panel said engine means is thereby rendered accessible for servicing operations.

4. A folding wing type aircraft comprising a body, a fixed wing panel extending from opposite sides of said body, a folding wing panel hingedly connected to each end of said fixed wing panel to comprise in combination with said fixed wing panel a foldable wing aircraft, said fixed wing panel and folding wing panels each including vertically disposed directionally aligned spar sections extending spanwise thereof, said spar sections in the regions of hinging connections between said fixed wing panel and said folding wing panels being formed to terminate in oppositely directed enlarged C-shaped yoke end portions terminating respectively in top and bottom end portions and pivotally interconnected respectively at the adjacent top end portions thereof to provide the hinge connections between said fixed wing panel and said folding wing panels, and aircraft engine means mounted upon the spar sections of said fixed wing panel so as to be thereby disposed within the configurations of the cooperating yoke portions when said wing panels are in extended positions, whereby upon upward pivoting of said folding wing panels said engine means are thereby substantially uncovered and rendered accessible for servicing operations.

5. A folding wing type aircraft comprising a body and folding wing panels hingedly mounted upon said body, said body and wing panels in the regions of hinging interconnection being provided with vertically disposed paired oppositely facing enlarged C-shaped yoke end portions terminating respectively in top and bottom end portions and pivotally interconnected at the adjacent top end portions thereof to provide the hinging connections between said body and said wing panels, and aircraft engine means mounted upon said body so as to be disposed within the configurations of said yoke portions when said wing panels are in extended positions, whereby upon upwardly folding of said wing panels said engine means are rendered accessible for servicing operations.

6. A folding wing type aircraft comprising a body, a folding wing panel hingedly connected to said body to comprise in combination therewith a folding wing aircraft, said wing panel including a vertically disposed spar section extending in spanwise direction thereof, said spar section in the region of the hinge connection being provided with an enlarged C-shaped yoke end portion terminating in top and bottom end portions and pivotally connected at its top end portion to said body, and aircraft engine means mounted so as to be disposed within the configuration of said yoke portion when said wing is in extended position, whereby upon upward folding of said wing panel said engine means is thereby rendered accessible for servicing operations.

7. In an airplane, two primary structural sections, the sections having confronting ends with a cavity therebetween, a turbo powerplant supported in the cavity, means hingedly connecting the sections at said ends whereby the sections may be hinged apart to expose the powerplant, and releasable means for holding the sections against such hinging.

RICHARD BRUCE FOSTER.

REFERENCES CITED

The following references are of record in the file of this patent:

UNITED STATES PATENTS

| Number | Name | Date |
|---|---|---|
| 1,319,414 | Page | Oct. 21, 1919 |

FOREIGN PATENTS

| Number | Country | Date |
|---|---|---|
| 474,003 | Great Britain | Oct. 24, 1937 |
| 606,088 | Great Britain | Aug. 5, 1948 |
| 700,031 | Germany | Dec. 11, 1940 |